Oct. 6, 1931.  O. F. ROHWEDDER  1,826,676
BREAD HANDLING APPARATUS
Filed May 13, 1929   2 Sheets-Sheet 1
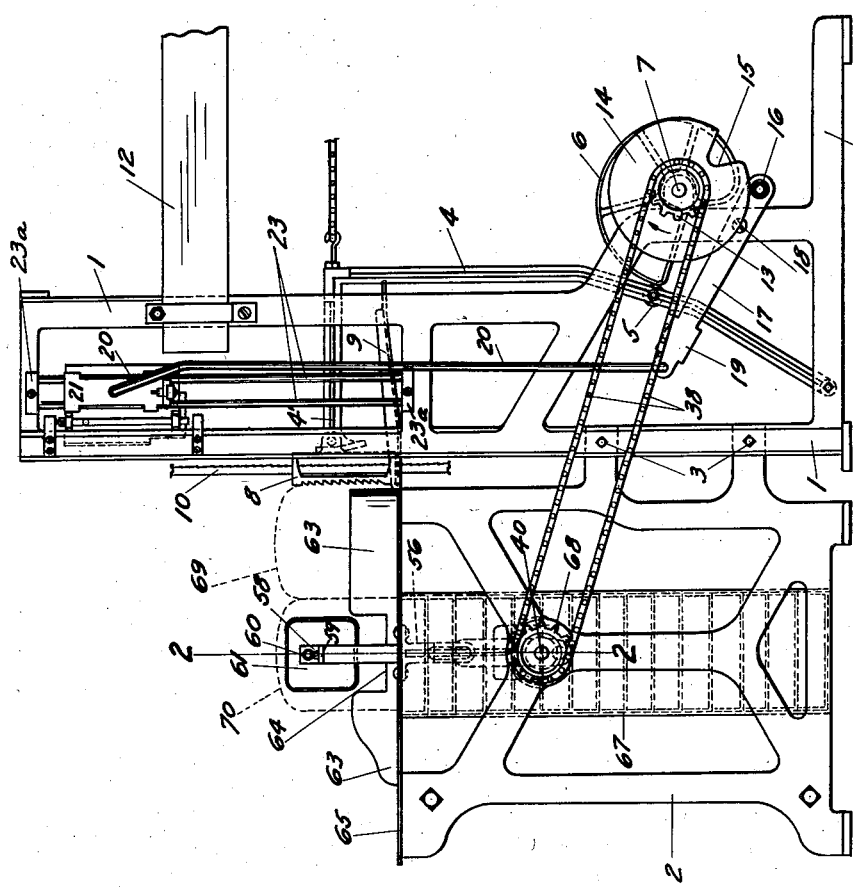
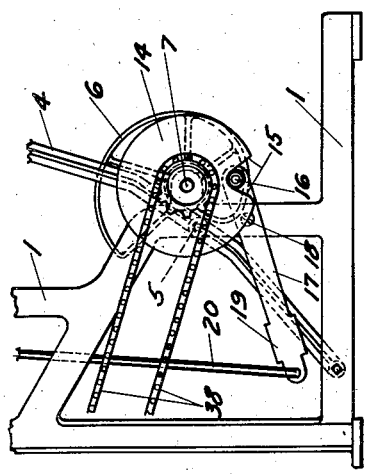
Otto F. Rohwedder INVENTOR.
BY
Curtis Bush ATTORNEY

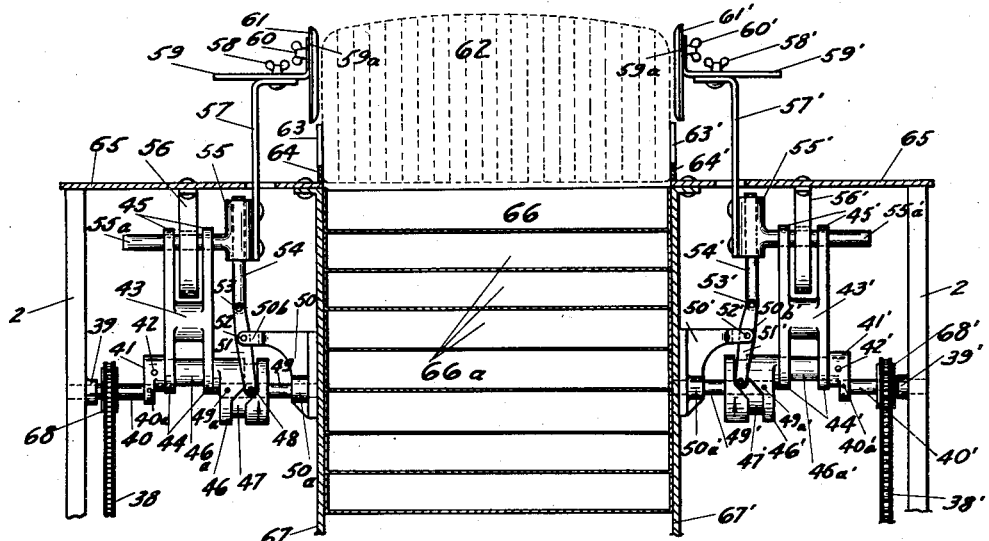
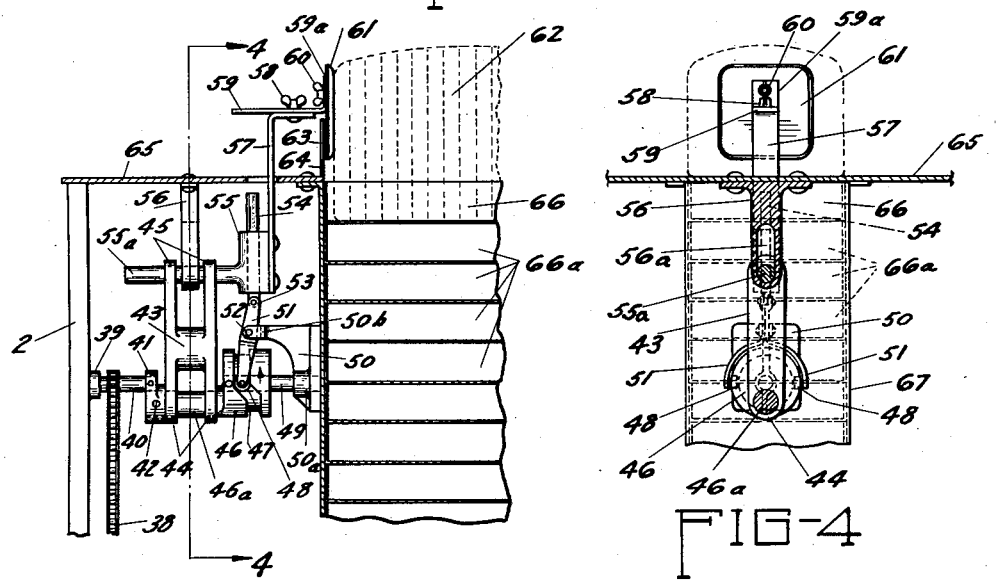

Patented Oct. 6, 1931

1,826,676

UNITED STATES PATENT OFFICE

OTTO F. ROHWEDDER, OF DAVENPORT, IOWA, ASSIGNOR TO MAC-ROH SALES & MFG. COMPANY, OF DAVENPORT, IOWA, A CORPORATION OF DELAWARE

BREAD HANDLING APPARATUS

Application filed May 13, 1929. Serial No. 362,575.

This invention relates to a method of and apparatus for handling bread and particularly apparatus for automatically placing bread into cartons or holders.

Another object is to provide mechanical means for receiving sliced bread from a slicing machine and automatically placing the same in loaf form into cartons or holders.

Another object is to provide mechanical means for rapidly and accurately placing sliced loaves of bread successively into individual cartons or containers.

A further object is to provide a novel method of placing sliced loaves of bread into cartons or holders which eliminates manual handling of the bread.

With the above and other objects in view, the present invention may be said to comprise the method of and apparatus for handling bread illustrated in the accompanying drawings to be hereinafter described and particularly set forth in the appended claims, together with such variations and modifications thereof as will be apparent to one skilled in the art to which this invention appertains.

In the drawings which illustrate a suitable embodiment of the present invention, Figure 1 is a side elevation showing the packing apparatus in combination with a slicing machine, portions of the slicing machine being broken away for clearness of illustration.

Fig. 2 is a transverse section taken on the line 2—2 of Fig. 1 showing the operating features of the packing apparatus.

Fig. 3 is a partial section similar to Fig. 2 showing one of the presser heads in its operative position.

Fig. 4 is a section taken on the line 4—4 of Fig. 1 showing one of the presser heads after it has moved the bread into the carton.

Fig. 5 is a partial side elevation of the mechanism for operating the bread slicing machine showing the position of the cam when the bread pusher is in its retracted position and when the table loading mechanism is in its lowermost position.

The packing apparatus of the present invention is particularly adapted to the type of bread slicing machine shown and described in my copending applications Serial Nos. 249,612 and 290,503 filed January 26, 1928, and July 5, 1928, respectively. It is to be understood, however, that the invention about to be described is equally as adaptable to any other type of slicing machine.

Since the means for operating the cutting blades are shown and described in detail in the above co-pending applications, the driving means is omitted and the blades are only partially shown in the drawings for clearness of illustration.

Referring to the accompanying drawings in which like numerals refer to like parts throughout the several views, the slicing machine, in general, comprises side frames 1 provided with pusher arms 4 pivoted thereto at their lower ends, their upper ends being formed with forwardly projecting extensions 4'. A slotted pusher head 8 is attached to the foremost ends of the extensions 4' and is adapted to be moved forwardly and rearwardly over a tiltable feed table 9 to feed the loaf of bread supported thereby to a number of aligned reciprocable cutting blades 10. As viewed in Fig. 1, the pusher head 8 is in its extreme forward position and has just moved a sliced loaf of bread 69 through the cutting blades 10 onto a delivery table 65, which is in horizontal alignment with the feed table 9. The delivery table 65 is supported on a subframe 2 which is secured to the main side frames 1 by suitable bolts 3.

The pusher levers 4 are pivoted forwardly and rearwardly by means of a suitable cam 6, shown in Figs. 1 and 2, which is rigidly mounted on a rotatable shaft 7, the cam 6 being adapted to contact with a cam follower 5 mounted on one of the pusher levers 4. It is obvious that as the shaft 7 rotates, the cam follower 5 continuously contacts with the cam 6 and causes the pusher head 8 through the medium of the levers 4 to move back and forth over the feed table 9 to progressively feed loaves of bread to the cutting blades 10. As described in the previously mentioned copending applications, the pusher arms 4 may be retracted to their rearmost position by gravity, assisted by a tension spring or any other desirable means. The position of the levers 4 in their rearmost position is clearly illustrated in Fig. 5.

In bread slicing machines used heretofore it has been the practice to place the bread to be sliced, by hand directly on the feed table. This prior practice is very slow because of the manual placing of the bread and is dangerous since oftentimes the operator has severely cut his hands and fingers by contact with the cutting blades. This practice furthermore is unsanitary since it is necessary to handle all the bread to be cut, by hand.

The bread to be sliced is preferably conveyed to the machine by a suitable conveyor 12 (shown diagrammatically in Fig. 1). One desirable type of conveyor is clearly shown and described in my co-pending application Serial No. 347,838, so will not be described in detail herein. The bread is progressively fed to the feeding appliance which will now be described, which appliance lowers the bread to a position adjacent the feed table 9 and discharges the same thereon.

The feeding appliance comprises two spaced elevator devices which are adapted to be vertically reciprocated at the sides of the machine. Each device preferably comprises a vertical slide plate 21 adapted to be reciprocated on a pair of parallel rods 23 are secured in a vertical direction outwardly of the feed table 9 to each side frame 1 by suitable clamps 23a, each pair of rods 23 having a side plate 21 mounted thereon.

Each plate 21 is reciprocated by a depending link 20 which is pivoted at its lower ends to one end of a crank 17, the crank 17 being pivoted intermediate its ends as indicated at 18 to the frame 1. The other end of the crank 17 as shown in Figs. 1 and 2 is provided with a cam follower 16 which contacts with a suitable cam 14 that is rigidly secured to the shaft 7. The cam is formed with an indentation 15 therein so that the cam follower 16 can move into the same and thereby actuate the crank. A weight 19 may be provided on the cranks 17 if desired to accelerate the downward movement of the feeding appliance. The cams 14 for the feeding appliance and the cam 6 for the pusher levers 4 are so arranged that the crank 17 is actuated only when the pusher is in its retracted position as shown in Fig. 5. The action of the cams however will be later described in detail.

The elevator devices, of which the side plates form a part are described in detail in my copending application filed of even date, so will not be further described herein. These elevators receive the loaf of bread when in their uppermost position and discharge the same onto the feed table 9 when in their lowermost position. Each loaf is discharged in front of the pusher 8 in the correct slicing position and is then moved thru the cutter blades 10 by the pusher 8 onto the delivery table 65.

The delivery table 65 is positioned to lie in the horizontal plane of the feed table 9, when the feed table is in its tilted position as shown in Figure 1, and is preferably provided with a pair of spaced adjustable guide plates 63 which form a chute arrangement for receiving the sliced bread from the cutting blades 10.

The sliced bread is placed in box-like cartons or holders 66 which are carried within a vertical chamber 67, each carton being adapted to be moved upwardly after a loaf of bread is placed in the preceding carton. These cartons 66 move upwardly through a recess formed in the delivery table 65 between the side plates 63.

The bread as it reaches a position directly over the opening is gripped and compressed and then lowered directly into the holder 66. This is accomplished in the present invention by means of a pair of spaced presser heads 61 positioned at the sides of the table 65 and adapted to be moved through recesses 64 formed in the guide plates 63.

The presser heads and the driving mechanism are identical so only one of the same will be described herein. It is to be noted that the parts of one side of the packing device are designated by numerals and at the other side by the same numerals and a prime.

Each presser head 61 is adjustably attached to an angular bar 59 by a wing nut 60, the angular bar 59 being adjustably mounted in a horizontal direction upon the upper end of a bracket 57. The bracket 57 as shown in Figure 2 is rigidly secured to a head block 55 which has a horizontal shank 55a formed integral therewith and mounted to slide laterally in the upper end of an H shaped link 43. The head block 55 is preferably formed with a vertical bore within which a shifting rod 54 is slidingly mounted. The lower end of the shifting rod 54 is pivotally connected to the upper end of a lever 51 that is pivoted intermediate its ends on a pivot pin 52. The pivot pin 52, as shown, is carried by a fork 50 and formed on the outer end of a bracket 50 which is preferably secured to the adjacent side wall of the carton chamber 67.

The bracket 50 is formed with a bored hub 50a, and a corresponding hub 39 aligned therewith is secured to the frame 2. A crank shaft assembly is revolvably mounted in the hubs 50a and 39 and comprises aligned horizontal shafts 40 and 49 respectively mounted in these hubs, and an eccentric or crank arm 46a which is secured by a pin 42 to a crank 41 carried by the shaft 40 and to a cam 46 carried by the shaft 49. If desired, the entire crank assembly, comprising the horizontal shafts 40 and 49, the cranks 41 and 46 and the arm 46ª, may be formed integral and machined as necessary.

The crank arm 46 pivotally extends through suitable openings formed in the lower ends 44 of the H shaped link 43, so that upon rotation of the crank assembly the shank 55a and consequently the member 55 will be reciprocated in a vertical direction. As shown in Figs. 3 and 4 the shank 55a is vertically guided in a slot 56a formed in a bracket 56 which is secured to the lower side of the table 65.

The crank or cam member 46 is formed with a groove 47, having one semicircular portion offset laterally with respect to the other. As shown in Figs. 3 and 4, the lower end of the lever 51 is forked and provided with cam rollers 48 at its ends which are guided in the groove 47.

As the crank assembly revolves, the lifting link 43 is raised and lowered and carries with it the head 55 and attached shank 55a. At the same time, the cam member 46 revolves and causes the fork at the lower end of the lever 51 to travel laterally of the machine because of the offset groove 47, thereby causing a corresponding travel in the opposite direction of the upper end of the lever 51, the shifting rod 54 and the head 55, the shank 55a thereof sliding laterally in the upper ends 45 of the link 43. Simultaneously however, because of the vertical movement of the head 55, the rod 54 slides vertically in the head 55.

The crank assembly is rotated by means of a sprocket 68 keyed to the shaft 40 and driven by means of a sprocket chain from a sprocket 13 carried by the main drive shaft 7.

In the operation of the packing device, a carton 66 is first placed in position to receive an approaching loaf 62 of bread. As the loaf is passed through the slicing blades 10 by the pusher 8, it occupies the position indicated at 69 in Figure 1 and as the next loaf moves through the cutting blades, it next occupies the position indicated at 70 and is supported under pressure between the side guides 63.

As the crank assemblies at the opposite sides of the machine revolve, the cams 46 carry the lower ends of the levers 51 outwardly, thereby driving, through the interconnecting mechanism, the presser heads 61 inwardly to compress the loaf 62 lengthwise to a length substantially less than the length of the carton 66 so that it will enter the carton easily.

Further, as the crank assemblies revolve they also reciprocate the headers 55 and consequently the presser heads 61. The vertical and lateral movements of the presser heads 61 are so synchronized that as the presser heads 61 are moved to their innermost positions, they are then simultaneously moved downwardly to position the loaf 62 into the carton or holder. As the crank assemblies complete their cycle of revolution the presser heads 61 move outwardly releasing the bread and then move upwardly to receive the next loaf. The sliced bread as soon as it is released, expands lengthwise and engages the ends of the tray or holder 66. It is then removed together with the retaining holder by any suitable means, either mechanically or manually and then wrapped if desired.

It is obvious that with the form of crank shaft assembly including the cam 46, the lateral movement of the presser heads 61 will be very rapid in both directions, while the vertical movement will be slow. There will be very little vertical movement during the lateral movement as the lateral movement takes place when the links 43 are substantially at their uppermost and lowermost points of travel.

It is preferred to use pasteboard cartons of approximately the same width and slightly less than the length of the loaf of bread so that the slices will remain under a slight pressure between the ends of the carton or holder when placed therein.

It is to be noted that the operation of the present invention is purely mechanical and that the bread at no time is touched by the hands of the operator, thus providing a sanitary means for packing sliced bread in cartons.

It is to be understood, however, that the type of bread packing apparatus shown and described, is presented for purposes of explanation and illustration, and that various modifications of the invention described can be made without departing from the spirit and substance of the broad invention, the scope of which is commensurate with the appended claims.

I claim:

1. A packing appliance for sliced loaves of bread comprising a frame, a table mounted thereon, a chute secured above the table, combined cam and crank shaft assemblies rotatably mounted in the frame under the table, compressor heads or blocks mounted adjacent to and on opposite sides of the chute above the table upon head-blocks united to and reciprocatingly driven simultaneously both laterally and vertically by the cams and cranks through intermediate actuating means operatively connected to the cranks and cams respectively, and means for driving the shaft assemblies.

2. A packing appliance for sliced loaves of bread comprising a frame, a table mounted thereon, a chute secured above the table, combined cam and crank shaft assemblies rotatably mounted in the frame under the table, compressor heads or blocks mounted adjacent to and on opposite sides of the chute above the table upon head-blocks united to and reciprocatingly driven simultaneously both laterally and vertically by the cams and cranks through intermediate connecting links and levers operatively connected to the cranks and cams respectively, and means for driving the assemblies.

3. A packing appliance for receiving a resilient article and placing the same in a holder, comprising a delivery table having means for supporting said holder, a pair of spaced guides secured to said table for receiving the article therebetween, spaced presser heads positioned above said guides, and means for moving said presser heads inwardly to compress the article away from said guides and then downwardly to position the article into said holder.

4. A packing appliance for receiving a resilient article and placing the same in a holder, comprising a delivery table having means for supporting said holder, a pair of spaced guides secured to said table for receiving the article therebetween, and a pair of movable presser heads movable from points above and slightly outside the planes of said guides to lower points slightly within the planes of said guides for positioning the article into said holder.

5. A packing appliance for receiving a resilient article and placing the same in a holder, comprising a delivery table having means for supporting said holder, a pair of spaced recessed guides adjustably secured to said table for receiving the article therebetween, a pair of movable presser heads movable through said recesses in said guides from points above and slightly outside the planes of said guides to lower points slightly within said guides for positioning the article into said holder.

6. A packing appliance for receiving sliced bread and placing the same in a holder, comprising a delivery table having means for supporting said holder, a pair of spaced presser heads mounted above and at opposite sides of said table, means for simultaneously reciprocating said presser heads laterally toward each other against the bread and vertically downwardly whereby the bread may be positioned in said holder, and means for actuating said reciprocating means.

7. A packing appliance for receiving sliced bread and placing the same in a holder, comprising a delivery table having means for supporting said holder, spaced presser heads above said table, and means for moving said presser heads inwardly against the bread supported by said table and then downwardly to position the bread into said holder, said last mentioned means for each of said presser heads comprising a rotatable crank for vertically reciprocating the adjacent presser head, a rotatable cam for laterally reciprocating said presser head, and means for simultaneously revolving said crank and cam.

8. Driving mechanism for a presser head of the class described, comprising a head block secured to said presser head, a revolvable crank, a link connecting said crank and head block for reciprocating said head block in a vertical direction, said head block being horizontally slidable in said link, a slide rod vertically movable in said head block, a cam rotatable with said crank, a centrally pivoted lever connecting said rod and cam, and means for simultaneously revolving said crank and cam whereby said presser head is simultaneously reciprocated in vertical and horizontal directions.

9. A packaging appliance for receiving sliced bread and placing the same in a holder, comprising a delivery table having a pair of spaced guides thereon for receiving a sliced loaf of bread therebetween, a recess in said table between said guides for receiving a holder and positioning the same adjacent the surface of said table, a pair of spaced presser heads positioned above said guides, and means for simultaneously moving said presser heads inwardly to compress the bread and then for moving said presser heads downwardly to position the bread into said holder.

In testimony whereof he affixes his signature.

OTTO F. ROHWEDDER.